A. LACHMAN.
PROCESS FOR AGING WINE.
APPLICATION FILED JULY 28, 1913.
1,204,669.
Patented Nov. 14, 1916.
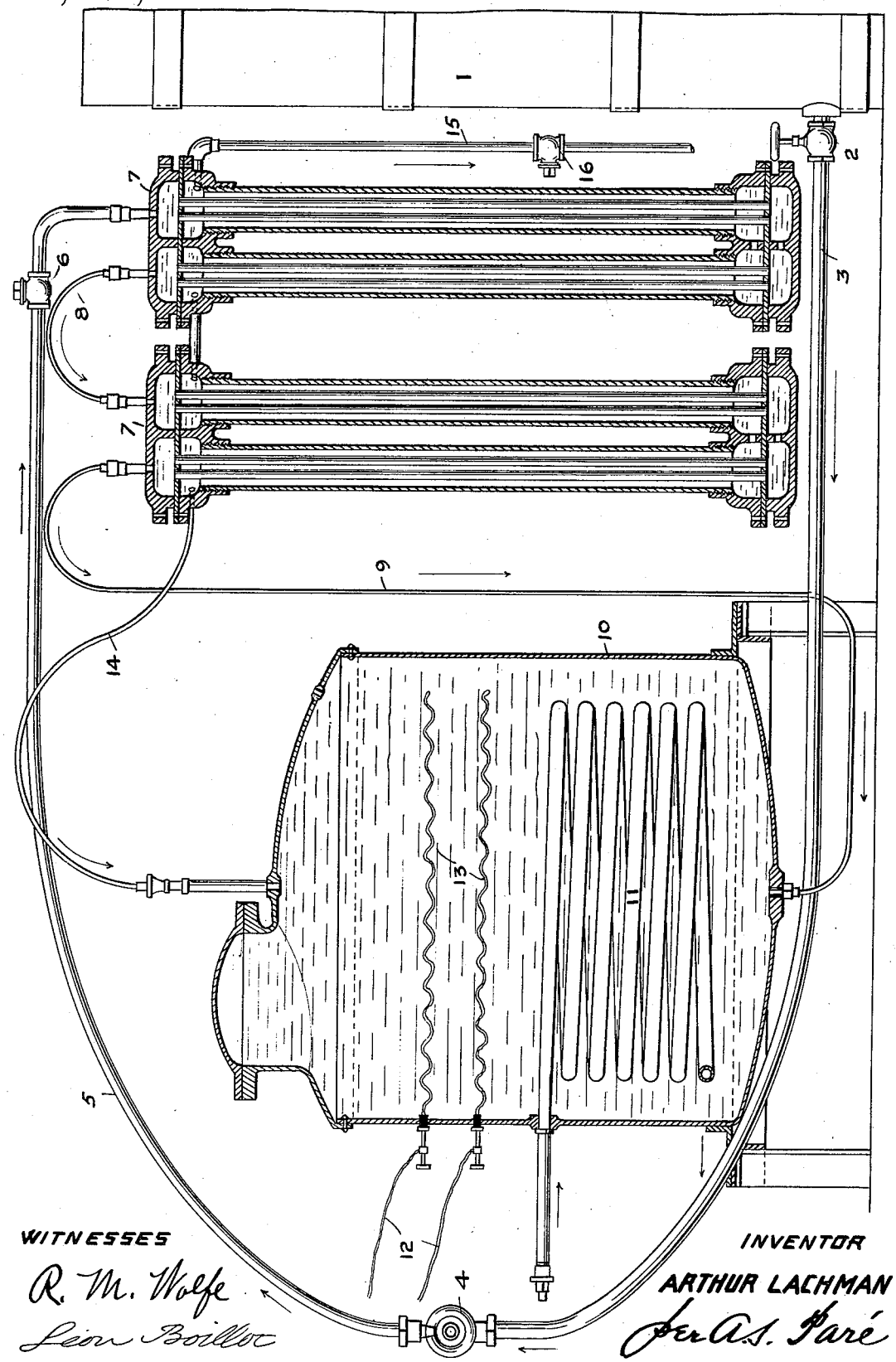
WITNESSES
R. M. Wolfe
Leon Boillot
INVENTOR
ARTHUR LACHMAN
per A. S. Paré
ATT'Y.

UNITED STATES PATENT OFFICE.

ARTHUR LACHMAN, OF BERKELEY, CALIFORNIA.

PROCESS FOR AGING WINE.

1,204,669.  Specification of Letters Patent.  Patented Nov. 14, 1916.

Application filed July 28, 1913. Serial No. 781,547.

*To all whom it may concern:*

Be it known that I, ARTHUR LACHMAN, a citizen of the United States, residing in Berkeley, county of Alameda, State of California, have invented certain new and useful Improvements in Processes for Aging Wine, whereof the following is a specification.

This invention relates to methods of aging wines, liquors, etc., and has for its object the hastening and perfection of the operation.

In carrying out my process I subject the wine to heat pressure and electricity, either simultaneously or consecutively. I also use the wine whose treatment has been completed to warm up the wine which is to be treated, the latter serving at the same time to cool the treated wine, thereby materially hastening the operation, and making it continuous instead of intermittent.

In the accompanying drawing which represents a sectional elevation showing the tank containing the raw wine, the heating coolers through which the wine passes to and from the heating tank, the treating tank itself, and the circulating system.

In the figure, 1 is the container containing the raw wine.

2 is a valve on a pipe 3, which leads to a pump 4, from which the pipe 5 conducts the wine through valve 6 to the heating coolers 7 connected by pipe 8, whence it passes through pipe 9 to the metallic treating tank 10, where it is heated by a heating coil 11, and subjected to electricity flowing through the mains 12 and electrodes 13. From the treating tank the wine passes through pipe 14 back to the heating coolers and is finally discharged through pipe 15 and valve 16. In this method of treatment the wine is forced through the apparatus under pressure which is controlled by the pump and the valves, and while under pressure in the treating tank is heated to the desired degree and subjected to the electric current until the treatment has progressed to the desired point.

In practice I have found that a pressure varying from 5 to 25 pounds per square inch produces satisfactory results with the sweet wines which I have had under treatment. I have also found that a temperature of 140° F. and a high tension alternating current have given satisfactory results.

I have, by this method carried out as above set forth, secured the same results in 24 hours, which have heretofore required many months.

Having thus described my invention, and believing I have produced useful and novel improvements in the art to which it appertains, let it be understood that I do not wish to be limited to the exact construction and arrangement of the several parts comprising the same, as many changes can be made without departing from the spirit thereof, but

What I claim and desire to secure by United States Letters Patent is:

The regenerative process of treating a moving current of wine, which consists in causing it to flow continuously, under pressure, through an enlarged chamber where its velocity is reduced, and, while so reduced, heating it and passing a current of electricity through it, and thereafter cooling it by returning it upon itself and using its surplus heat to initiate the warming of the oncoming current.

In testimony, that I claim the foregoing I have hereto set my hand in the presence of witnesses, this twenty-first day of July, 1913.

ARTHUR LACHMAN.

Witnesses:
R. M. WOLFE,
JOSEPH ROSENTHAL.